(12) United States Patent
Uchida

(10) Patent No.: US 9,900,494 B2
(45) Date of Patent: Feb. 20, 2018

(54) IMAGING DEVICE AND FOCUS CONTROL METHOD

(71) Applicant: FUJIFILM Corporation, Tokyo (JP)

(72) Inventor: Akihiro Uchida, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/454,522

(22) Filed: Mar. 9, 2017

(65) Prior Publication Data
US 2017/0187950 A1   Jun. 29, 2017

Related U.S. Application Data

(63) Continuation of application No. PCT/JP2015/063792, filed on May 13, 2015.

(30) Foreign Application Priority Data

Sep. 9, 2014  (JP) ................ 2014-183532

(51) Int. Cl.
*H04N 5/232* (2006.01)
*G02B 27/58* (2006.01)
*G02B 7/36* (2006.01)

(52) U.S. Cl.
CPC ......... *H04N 5/23212* (2013.01); *G02B 7/365* (2013.01); *G02B 27/58* (2013.01)

(58) Field of Classification Search
CPC ..... G02B 27/58; G02B 7/365; H04N 5/23212
See application file for complete search history.

(56) References Cited

U.S. PATENT DOCUMENTS

| | | | | |
|---|---|---|---|---|
| 2005/0041949 A1* | 2/2005 | Onuki | ............... | G02B 27/58 385/140 |
| 2009/0153705 A1* | 6/2009 | Katsuda | ............... | H04N 9/045 348/273 |
| 2011/0001858 A1 | 1/2011 | Shintani et al. | | |
| 2013/0044246 A1 | 2/2013 | Shintani et al. | | |
| 2013/0060660 A1 | 2/2013 | Shintani et al. | | |
| 2014/0204231 A1* | 7/2014 | Takahara | ............... | G02B 7/34 348/220.1 |

FOREIGN PATENT DOCUMENTS

| | | |
|---|---|---|
| JP | 10-268382 A | 10/1998 |
| JP | 2005-62732 A | 3/2005 |
| JP | 2013-178387 A | 9/2013 |
| JP | 2014-63100 A | 4/2014 |
| WO | WO 2009/104390 A1 | 8/2009 |

OTHER PUBLICATIONS

International Search Report, issued in PCT/JP2015/063792, dated Aug. 11, 2015.
Written Opinion of the International Searching Authority, issued in PCT/JP2015/063792, dated Aug. 11, 2015.

* cited by examiner

*Primary Examiner* — Twyler Haskins
*Assistant Examiner* — Fayez Bhuiyan
(74) *Attorney, Agent, or Firm* — Birch, Stewart, Kolasch & Birch, LLP

(57) ABSTRACT

In a state in which an APD filter is present on an optical axis of an imaging optical system, a digital camera sets the maximum movable amount of a focus lens to one side of an optical axis direction to a value that is less than that in a state in which the APD filter is not present on the optical axis of the imaging optical system and moves the focus lens in the range of the set maximum movable amount.

19 Claims, 11 Drawing Sheets

IMAGING DEVICE AND FOCUS CONTROL METHOD

CROSS REFERENCE TO RELATED APPLICATION

This is a continuation of International Application No. PCT/JP2015/063792 filed on May 13, 2015, and claims priority from Japanese Patent Application No. 2014-183532 filed on Sep. 9, 2014, the entire disclosures of which are incorporated herein by reference.

BACKGROUND OF THE INVENTION

1. Field of the Invention

The present invention relates to an imaging device and a focus control method.

2. Description of the Related Art

An apodization filter (hereinafter, referred to as an APD filter) has been known as an optical filter for improving the quality of an image that is out of focus, that is, a so-called blurred image. When the APD filter is used, it is possible to smooth the contour of a blurred image.

JP2005-62732A discloses an imaging device in which an APD filter can be inserted into an optical path and focus control is performed by a phase-difference autofocus (AF) system in a state in which the APD filter is inserted into the optical path.

JP2013-178387A discloses a technique which is not related to an imaging device provided with an APD filter and limits the range in which a focus lens can be driven in order to reduce the time required for the completion of focusing when focus control is formed by a phase difference AF system.

SUMMARY OF THE INVENTION

A structure is considered in which an imaging element captures an image of an object through an imaging optical system including an APD filter and the amount of defocus is calculated from an image signal captured by the imaging operation by a phase difference AF system. In this case, the intensity of light that passes through a peripheral portion of the APD filter is lower than the intensity of light that passes through a central portion of the APD filter. Therefore, a signal group that is output from each of a pair of phase difference detection pixel groups closer to a peripheral portion of the imaging element has a larger amount of noise and an error is likely to occur in the result of the correlation operation between the signal groups.

In some cases, a pair of images captured by the pair of phase difference detection pixel groups are asymmetric due to the APD filter. As a result, an error is likely to occur in the result of the correlation operation. The error is also affected by the position of the pair of phase difference detection pixel groups on a light receiving surface of the imaging element.

The accuracy of focus control which is based on the amount of defocus calculated by the correlation operation is reduced by the influence of the error. Therefore, even if a process which determines the amount of defocus and moves the focus lens to the focus position based on the determined amount of defocus is performed several times, it is difficult to always obtain a state in which the imaging element is focused since an error is likely to occur in the amount of defocus. JP2005-62732A and JP2013-178387A do not consider these problems.

The invention has been made in view of the problems and an object of the invention is to provide an imaging device and a focus control method that can improve the accuracy of focus control when the focus control is performed by a phase difference AF system using an imaging optical system including an APD filter.

An imaging device according to the invention comprises: an imaging element that captures an image of an object through an imaging optical system including a focus lens; and a phase difference AF control unit that performs a first focus control process which calculates an amount of defocus based on an image signal captured by the imaging element, using a phase difference AF system, and moves the focus lens in an optical axis direction based on the calculated amount of defocus. In a state in which an optical filter, of which the transmittance is reduced as a distance from a center of an optical axis of the imaging optical system in a direction perpendicular to the optical axis increases, is present on the optical axis of the imaging optical system, the phase difference AF control unit performs a focus lens movement amount setting process that sets a maximum movable amount of the focus lens to one side of the optical axis direction to a value that is smaller than that in a state in which the optical filter is not present on the optical axis of the imaging optical system and moves the focus lens in a range of the set maximum movable amount during the first focus control process.

A focus control method according to the invention that is performed by an imaging device including an imaging element that captures an image of an object through an imaging optical system including a focus lens comprises a phase difference AF control step of performing a first focus control process which calculates an amount of defocus based on an image signal captured by the imaging element, using a phase difference AF system, and moves the focus lens in an optical axis direction based on the calculated amount of defocus. In the phase difference AF control step, in a state in which an optical filter, of which the transmittance is reduced as a distance from a center of an optical axis of the imaging optical system in a direction perpendicular to the optical axis increases, is present on the optical axis of the imaging optical system, a focus lens movement amount setting process that sets a maximum movable amount of the focus lens to one side of the optical axis direction to a value that is smaller than that in a state in which the optical filter is not present on the optical axis of the imaging optical system is performed to move the focus lens in a range of the set maximum movable amount.

According to the invention, it is possible to provide an imaging device and a focus control method that can improve the accuracy of focus control when the focus control is performed by a phase difference AF system using an imaging optical system including an APD filter.

DESCRIPTION OF THE PREFERRED EMBODIMENTS

Hereinafter, an embodiment of the invention will be described with reference to the drawings.

Figure 1:
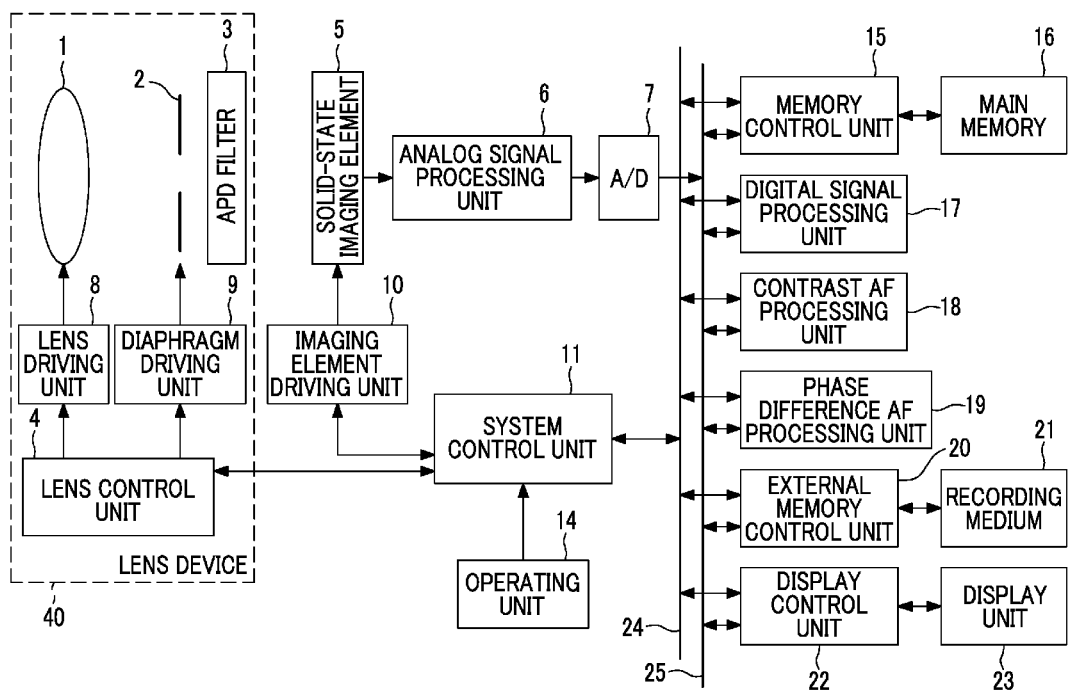
FIG. 1 is a diagram schematically illustrating the structure of a digital camera which is an example of an imaging device for describing an embodiment of the invention.

FIG. 1 is a diagram schematically illustrating the structure of a digital camera as an example of an imaging device for describing an embodiment of the invention.

The digital camera illustrated in FIG. 1 comprises a lens device 40 including an imaging lens 1 that includes a focus lens for focus adjustment and a zoom lens for changing a zoom magnification, a diaphragm 2, an APD filter 3, a lens control unit 4, a lens driving unit 8, and a diaphragm driving unit 9. In this embodiment, the lens device 40 is attachable to and detachable from a digital camera body. However, the lens device 40 may be fixed to the digital camera body.

The imaging lens 1 forms an imaging optical system and includes at least the focus lens. The focus lens means a lens that is moved in an optical axis direction to adjust the focus position of the imaging optical system. In a case in which the imaging lens including a plurality of lenses is a unit focus lens, all of the lens groups are the focus lenses.

The APD filter 3 is an optical filter of which the transmittance is reduced as the distance from the center of the optical axis of the imaging optical system in a direction perpendicular to the optical axis increases. As the lens device 40, a type in which the APD filter 3 is fixed on the optical axis as illustrated in FIG. 1 or a type in which a state in which the APD filter 3 is inserted into the optical axis and a state in which the APD filter 3 is evacuated from the optical axis can be switched can be mounted on the digital camera body. In addition, the lens device 40 without the APD filter 3 can be mounted on the digital camera body.

The lens control unit 4 of the lens device 40 is configured to communicate with a system control unit 11 of the digital camera body and drives the focus lens included in the imaging lens 1 through the lens driving unit 8 or drives the diaphragm 2 through the diaphragm driving unit 9, in response to commands from the system control unit 11.

In a case in which the lens device 40 is a type in which the APD filter 3 can be inserted into and removed from the optical axis, the lens control unit 4 performs control such that the APD filter 3 is inserted into the optical axis or is evacuated from the optical axis, in response to commands from the system control unit 11.

The lens control unit 4 is provided with a memory and the memory stores at least information indicating whether the APD filter 3 is present in the lens device 40. The lens control unit 4 transmits APD filter information including the information indicating whether the APD filter 3 is present to the system control unit 11, in response to a request from the system control unit 11. In a case in which the lens device 40 is the type in which the APD filter 3 can be inserted into and removed from the optical axis, the lens control unit 4 also transmits information indicating whether the APD filter 3 has been inserted into the optical axis as the APD filter information to the system control unit 11.

The digital camera body comprises an imaging element 5 that is, for example, a charge coupled device (CCD) type or a complementary metal oxide semiconductor (CMOS) type and captures an image of an object through the imaging optical system, an analog signal processing unit 6 that is connected to the output of the imaging element 5 and performs analog signal processing, such as a correlated double sampling process, and an A/D conversion circuit 7 that converts an analog signal output from the analog signal processing unit 6 into a digital signal. The analog signal processing unit 6 and the A/D conversion circuit 7 are controlled by the system control unit 11. The analog signal processing unit 6 and the A/D conversion circuit 7 are provided in the imaging element 5.

The system control unit 11 that controls the overall operation of an electric control system of the digital camera drives the imaging element 5 through an imaging element driving unit 10 and outputs an object image captured through the lens device 40 as a captured image signal. An instruction signal from a user is input to the system control unit 11 through an operating unit 14.

The system control unit 11 selects a contrast AF processing unit 18 and a phase difference AF processing unit 19 and moves the focus lens to a focus position determined by the selected processing unit, which will be described below.

In addition, the electric control system of the digital camera comprises a main memory 16, a memory control unit 15 that is connected to the main memory 16, a digital signal processing unit 17 that performs, for example, an interpolation operation, a gamma correction operation, and an RGB/YC conversion process for the captured image signal output from the A/D conversion circuit 7 to generate captured image data, the contrast AF processing unit 18 that determines the focus position using a contrast AF system, the phase difference AF processing unit 19 that determines the focus position using a phase difference AF system, an external memory control unit 20 to which an attachable and detachable recording medium 21 is connected, and a display control unit 22 to which a display unit 23 mounted on, for example, the rear surface of the camera is connected.

The memory control unit 15, the digital signal processing unit 17, the contrast AF processing unit 18, the phase difference AF processing unit 19, the external memory control unit 20, and the display control unit 22 are connected to each other by a control bus 24 and a data bus 25 and are controlled by commands output from the system control unit 11.

Figure 2:
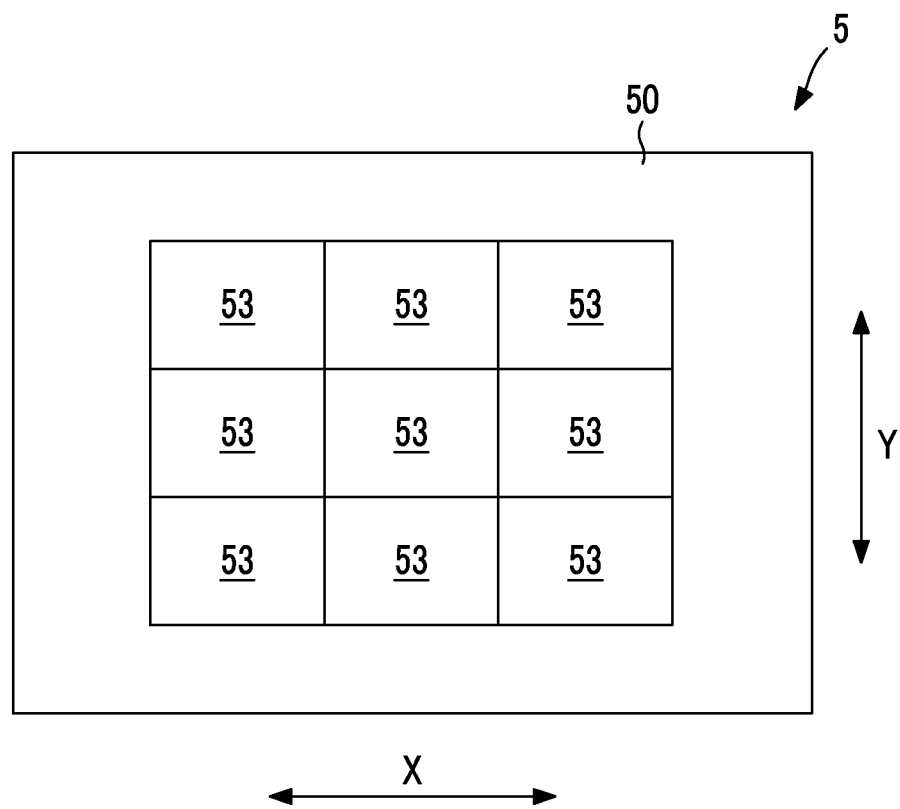
FIG. 2 is a plan view schematically illustrating the overall structure of an imaging element 5 provided in the digital camera illustrated in FIG. 1.

FIG. 2 is a plan view schematically illustrating the overall structure of the imaging element 5 mounted on the digital camera illustrated in FIG. 1.

The imaging element 5 has a light receiving surface 50 on which a plurality of pixels are two-dimensionally arranged in a row direction X and a column direction Y perpendicular to the row direction X. In the example illustrated in FIG. 2, nine AF areas 53 which are focus areas are provided on the light receiving surface 50.

The AF area 53 includes imaging pixels and phase difference detection pixels as pixels.

In the light receiving surface 50, only the imaging pixels are disposed in a portion other than the AF areas 53. The AF areas 53 may be provided on the light receiving surface 50 without a gap therebetween.

Figure 3:
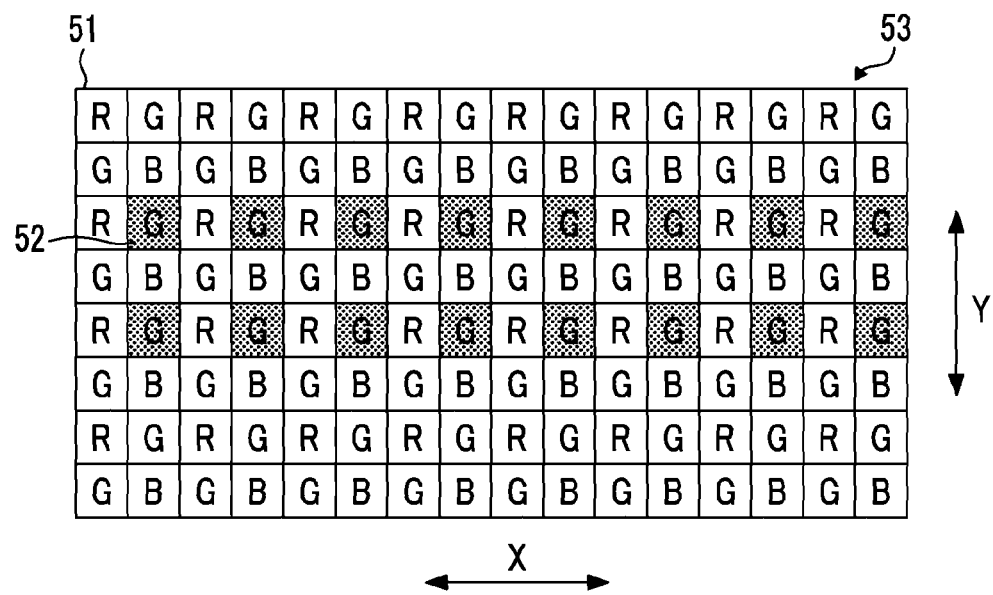
FIG. 3 is a partial enlarged view illustrating one AF area 53 illustrated in FIG. 2.

FIG. 3 is a partial enlarged view illustrating one AF area 53 illustrated in FIG. 2.

In the AF area 53, pixels 51 are two-dimensionally arranged. Each pixel 51 includes a photoelectric conversion unit, such as a photodiode, and a color filter that is formed above the photoelectric conversion unit.

In FIG. 3, a letter "R" is given to a pixel 51 (which is also referred to as an R pixel 51) including a color filter (R filter) that transmits red light, a letter "G" is given to a pixel 51 (which is also referred to as a G pixel 51) including a color filter (G filter) that transmits green light, and a letter "B" is given to a pixel 51 (which is also referred to as a B pixel 51) including a color filter (B filter) that transmits blue light. The color filters are arranged in a Bayer array on the entire light receiving surface 50.

In the AF area 53, some (hatched pixels 51 in FIG. 3) of the G pixels 51 are the phase difference detection pixels 52. In the example illustrated in FIG. 3, among pixel rows including the R pixel 51 and the G pixel 51, each G pixel 51 in an arbitrary pixel row and the G pixels 51 which are closest to each G pixel 51 in the column direction Y are the phase difference detection pixels 52. Here, as illustrated in FIG. 3, one direction in the two-dimensional array is defined as the row direction X and the other direction is defined as the column direction Y.

Figure 4:
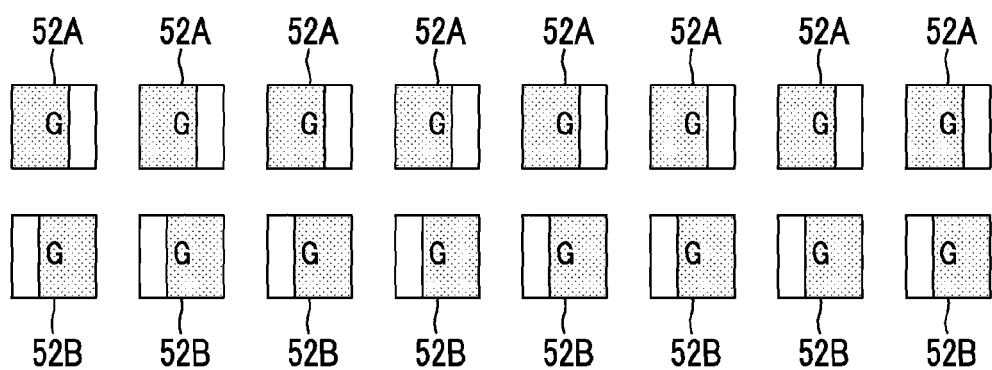
FIG. 4 is a diagram illustrating only phase difference detection pixels 52 illustrated in FIG. 3.

FIG. 4 is a diagram illustrating only the phase difference detection pixels 52 illustrated in FIG. 3.

As illustrated in FIG. 4, the phase difference detection pixels 52 include two types of pixels, that is, a phase difference detection pixel 52A and a phase difference detection pixel 52B.

The phase difference detection pixel 52A is a first signal detection unit that receives one of a pair of light beams which pass through different portions of a pupil region of the imaging lens 1 and detects a signal corresponding to the amount of light received.

The phase difference detection pixel 52B is a second signal detection unit that receives the other of the pair of light beams and detects a signal corresponding to the amount of light received.

In the AF area 53, a plurality of pixels 51 other than the phase difference detection pixels 52A and 52B are the imaging pixels. The imaging pixel receives the pair of light beams passing through the imaging lens 1 and detects a signal corresponding to the amount of light received.

A light shielding film is provided above the photoelectric conversion unit of each pixel 51. An opening that defines the light receiving area of the photoelectric conversion unit is formed in the light shielding film.

The center of the opening of the imaging pixel 51 is aligned with the center of the photoelectric conversion unit of the imaging pixel 51. In contrast, the center of an opening (a white portion in FIG. 4) of the phase difference detection pixel 52A deviates from the center of the photoelectric conversion unit of the phase difference detection pixel 52A to the right. In addition, the center of an opening (a white portion in FIG. 4) of the phase difference detection pixel 52B deviates from the center of the photoelectric conversion unit of the phase difference detection pixel 52B to the left. Here, the right side is one side of the row direction X illustrated in FIG. 3 and the left side is the other side of the row direction X.

Figure 5:
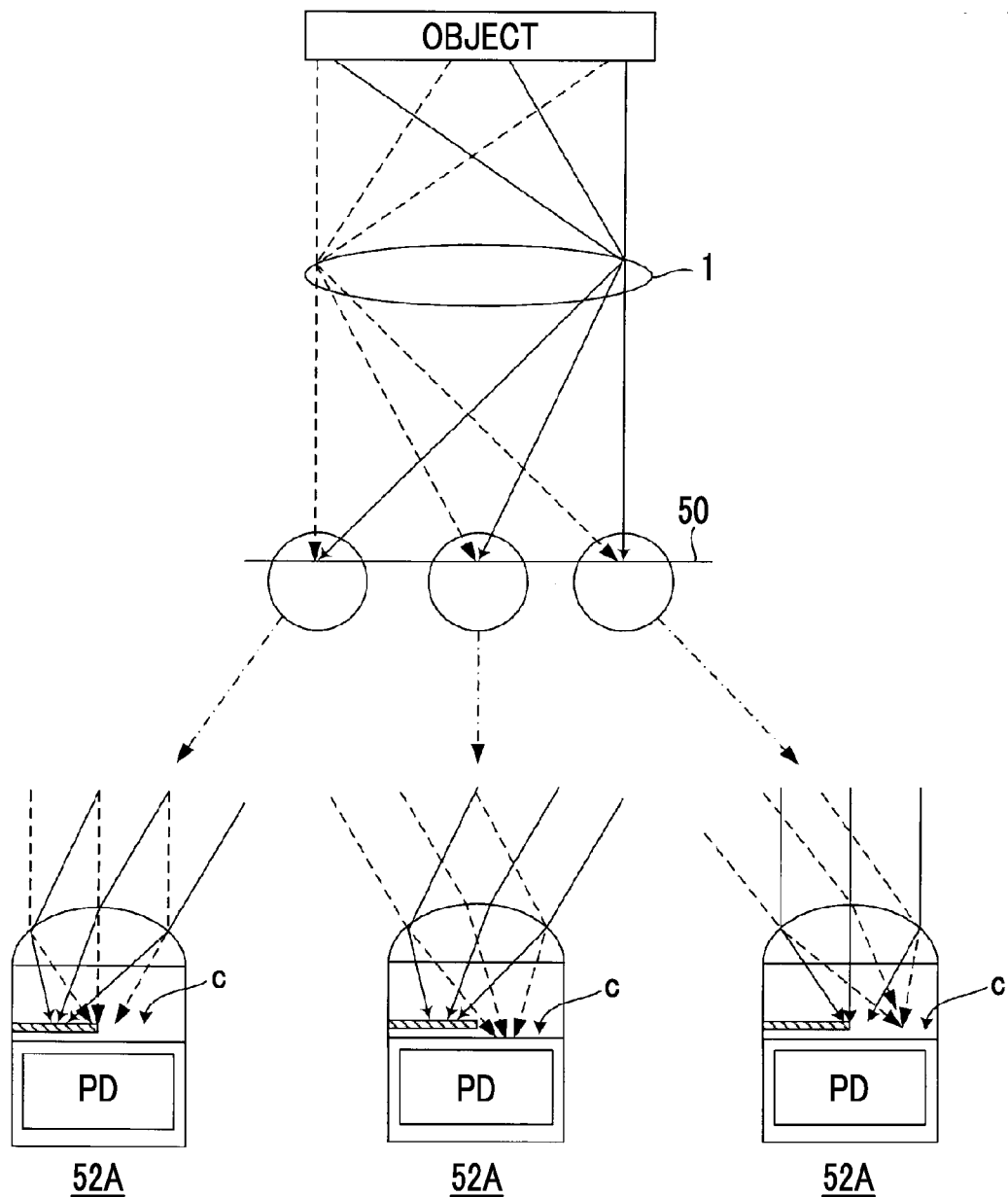
FIG. 5 is a diagram illustrating the cross-sectional structure of a phase difference detection pixel 52A.

FIG. 5 is a diagram illustrating the cross-sectional structure of the phase difference detection pixel 52A. As illustrated in FIG. 5, an opening c of the phase difference detection pixel 52A deviates to the right with respect to the photoelectric conversion unit (PD). As illustrated in FIG. 5, when one side of the photoelectric conversion unit is covered with the light shielding film, it is possible to selectively shield light which is incident in a direction opposite to the direction in which the photoelectric conversion unit is covered with the light shielding film.

According to this structure, a phase difference in the row direction X between the images captured by a pixel group including the phase difference detection pixels 52A in an arbitrary row and a pixel group including the phase difference detection pixels 52B which are arranged at the same distance from each phase difference detection pixel 52A of the pixel group in one direction can be detected by the two pixel groups.

The imaging element 5 is not limited to the structure illustrated in FIGS. 2 to 5 as long as it has a plurality of pairs of the signal detection units that receive one of the pair of light beams passing through different portions of the pupil region of the imaging lens 1 and detect a signal corresponding to the amount of light received and the signal detection units that receive the other of the pair of light beams and detect a signal corresponding to the amount of light received.

For example, the imaging element 5 may have a structure in which all of the pixels included in the imaging element 5 are used as the imaging pixels 51, each imaging pixel 51 is divided into two areas, one of the two divided areas is used as the phase difference detection pixel 52A, and the other divided area is used as the phase difference detection pixel 52B.

Figure 6:
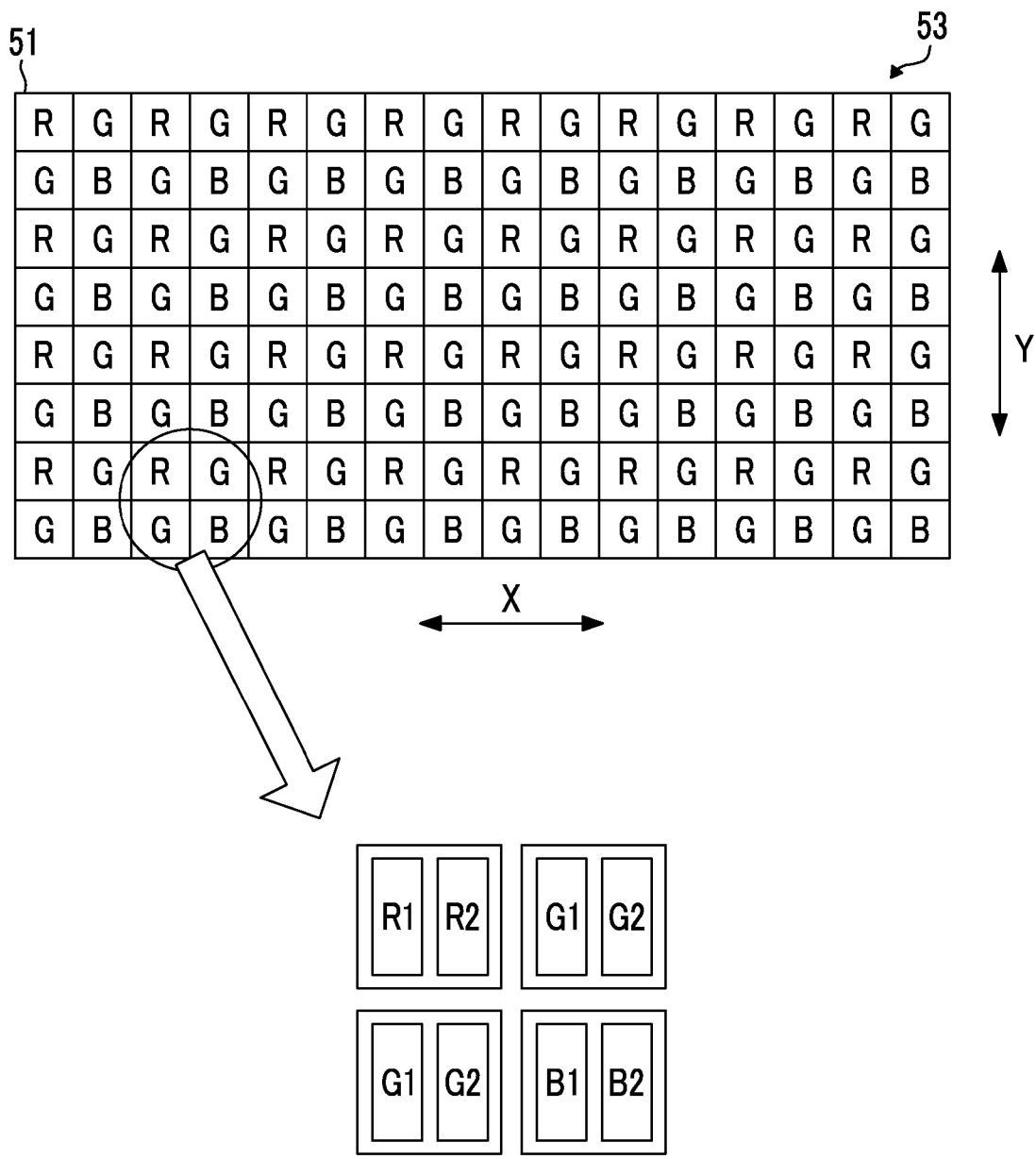
FIG. 6 is a diagram illustrating a structure in which all of the pixels included in the imaging element 5 are used as imaging pixels 51 and each imaging pixel 51 is divided into two areas.

FIG. 6 is a diagram illustrating the structure in which all of the pixels included in the imaging element 5 are used as the imaging pixels 51 and each imaging pixel 51 is divided into two areas.

In the structure illustrated in FIG. 6, in the imaging element 5, the imaging pixel 51, to which the letter "R" is given, is divided into two areas, and two divided areas are used as a phase difference detection pixel R1 and a phase difference detection pixel R2. In the imaging element 5, the imaging pixel 51, to which the letter "G" is given, is divided into two areas, and two divided areas are used as a phase difference detection pixel G1 and a phase difference detection pixel G2. In the imaging element 5, the imaging pixel 51, to which the letter "B" is given, is divided into two areas, and two divided areas are used as a phase difference detection pixel B1 and a phase difference detection pixel B2.

In this structure, the phase difference detection pixels R1, G1, and B1 are the first signal detection units and the phase difference detection pixels R2, G2, and B2 are the second signal detection units. Signals can be independently read from the first signal detection units and the second signal detection units. When signals from the first signal detection units and the second signal detection units are added, it is possible to obtain a normal imaging signal without a phase difference. That is, in the structure illustrated in FIG. 6, all of the pixels can be used as both the phase difference detection pixels and the imaging pixels.

The phase difference AF processing unit 19 illustrated in FIG. 1 calculates a phase difference which is the amount of relative positional deviation between two images formed by the pair of light beams, using a detection signal group read from the phase difference detection pixels 52A and the phase difference detection pixels 52B in one AF area 53 which is selected from nine AF areas 53 by, for example, an operation of the user.

The phase difference AF processing unit 19 calculates the focus-adjusted state of the imaging lens 1 on the basis of the phase difference. Here, the phase difference AF processing unit 19 calculates the amount of deviation from a focus state and a deviation direction from the focus state, that is, the amount of defocus. The phase difference AF processing unit 19 determines the focus position of the focus lens from the amount of defocus.

Specifically, when data of one detection signal group is A[1] . . . A[k], data of the other detection signal group is B[1] . . . B[k], and the deviation between two data items is "d", the phase difference AF processing unit 19 calculates an area S[d] that is surrounded by two data waveforms calculated by the following expression.

$$S[d] = \sum_{n=1}^{k} (A[n+d] - B[n])^2 \quad (1)$$

$$d = -L, \ldots, -2, -1, 0, 1, 2, \ldots, L$$

The phase difference AF processing unit 19 calculates, as the phase difference, the value of d when a correlation value S[d] is the minimum and calculates the amount of defocus from the phase difference. The system control unit 11 converts the calculated amount of defocus into a lens driving signal and moves the focus lens to the focus position based on the amount of defocus according to the converted lens driving signal.

The contrast AF processing unit 18 illustrated in FIG. 1 analyzes an image which is captured by one AF area 53 selected from the nine AF areas 53 by, for example, an operation of the user and calculates the focus position of the imaging lens 1 using a known contrast AF system.

That is, the contrast AF processing unit 18 calculates the contrast (difference in brightness) of an image signal captured for each moving position (a plurality of positions) of the focus lens while moving the position of the focus lens of the imaging lens 1 under the control of the system control unit 11. Then, the contrast AF processing unit 18 determines the position of the focus lens where the contrast is the maximum as the focus position. The contrast is obtained by calculating the sum of the differences between signals from adjacent pixels.

The phase difference AF processing unit 19 and the system control unit 11 function as a phase difference AF control unit that performs a first focus control process of calculating the amount of defocus, using the phase difference AF system, and moving the focus lens in the optical axis direction on the basis of the calculated amount of defocus.

In addition, the contrast AF processing unit 18 and the system control unit 11 function as a contrast AF control unit that performs a second focus control process of moving the focus lens to the focus position calculated by the contrast AF system. The system control unit 11 selectively performs the first focus control process and the second focus control process.

When performing the first focus control process, the system control unit 11 performs a focus lens movement amount setting process that sets the maximum movable amount of the focus lens to one side of the optical axis direction. Specifically, in a state in which the lens device 40 including the APD filter 3 is mounted on the digital camera body and the APD filter 3 is present on the optical axis, the system control unit 11 sets the maximum movable amount of the focus lens to a value that is less than that in a state in which the APD filter 3 is not present on the optical axis (including a state in which the lens device 40 without the APD filter 3 is mounted).

Figure 7:
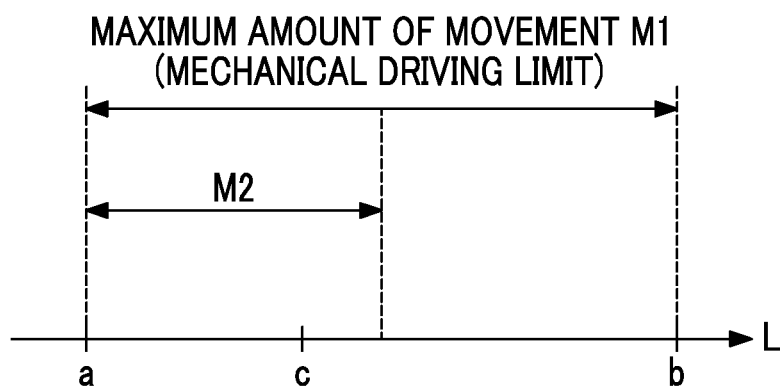
FIG. 7 is a diagram illustrating the maximum movable amount of a focus lens.

FIG. 7 is a diagram illustrating the maximum movable amount of the focus lens.

In FIG. 7, a horizontal axis L indicates the position of the lens device 40 on the optical axis. The movable range (that is, the mechanical driving limit) of the focus lens is designed as a range M1 from a position L=a to a position L=b. In terms of the design, the maximum movable amount of the focus lens to one side in the optical axis direction is M1.

The system control unit 11 changes the maximum movable amount M1 depending on whether the APD filter 3 is present on the optical axis of the lens device 40. The system control unit 11 sets the maximum movable amount to M1 in a state in which the APD filter 3 is not present on the optical axis of the lens device 40 and sets the maximum movable amount to M2 less than M1 in a state in which the APD filter 3 is present on the optical axis of the lens device 40. In the example illustrated in FIG. 7, the maximum movable amount M2 is half of the maximum movable amount M1.

As described above, in a state in which the APD filter 3 is present on the optical axis, an error is likely to occur in the amount of defocus calculated by the phase difference AF system. Here, the following case is considered: an error in which the amount of defocus calculated by the phase difference AF processing unit 19 is significantly greater than a true value occurs.

For example, in FIG. 7, it is assumed that a true focus position is L=c and the current position of the focus lens is L=a. When the amount of movement of the focus lens which is determined on the basis of the amount of defocus is M1, the focus lens is moved to a position L=b. In this state, since the position of the focus lens is far away from the true focus position, the focus lens can never be moved close to the position L=c even if the first focus control process is repeated.

In contrast, when the maximum movable amount is set to M2, the focus lens is moved only to M2 even if the amount of movement of the focus lens which is determined on the basis of the amount of defocus is M1. Therefore, the focus lens is likely to be moved close to the true focus position and a focus direction is changed. As a result, it is possible to reduce the error (correlation operation error) of the amount of defocus calculated by the subsequent process. That is, the calculation of the amount of defocus and the movement of the focus lens based on the calculated amount of defocus are repeated to move the focus lens close to true focus position. Finally, it is possible to move the focus lens to the true focus position.

Figure 8:
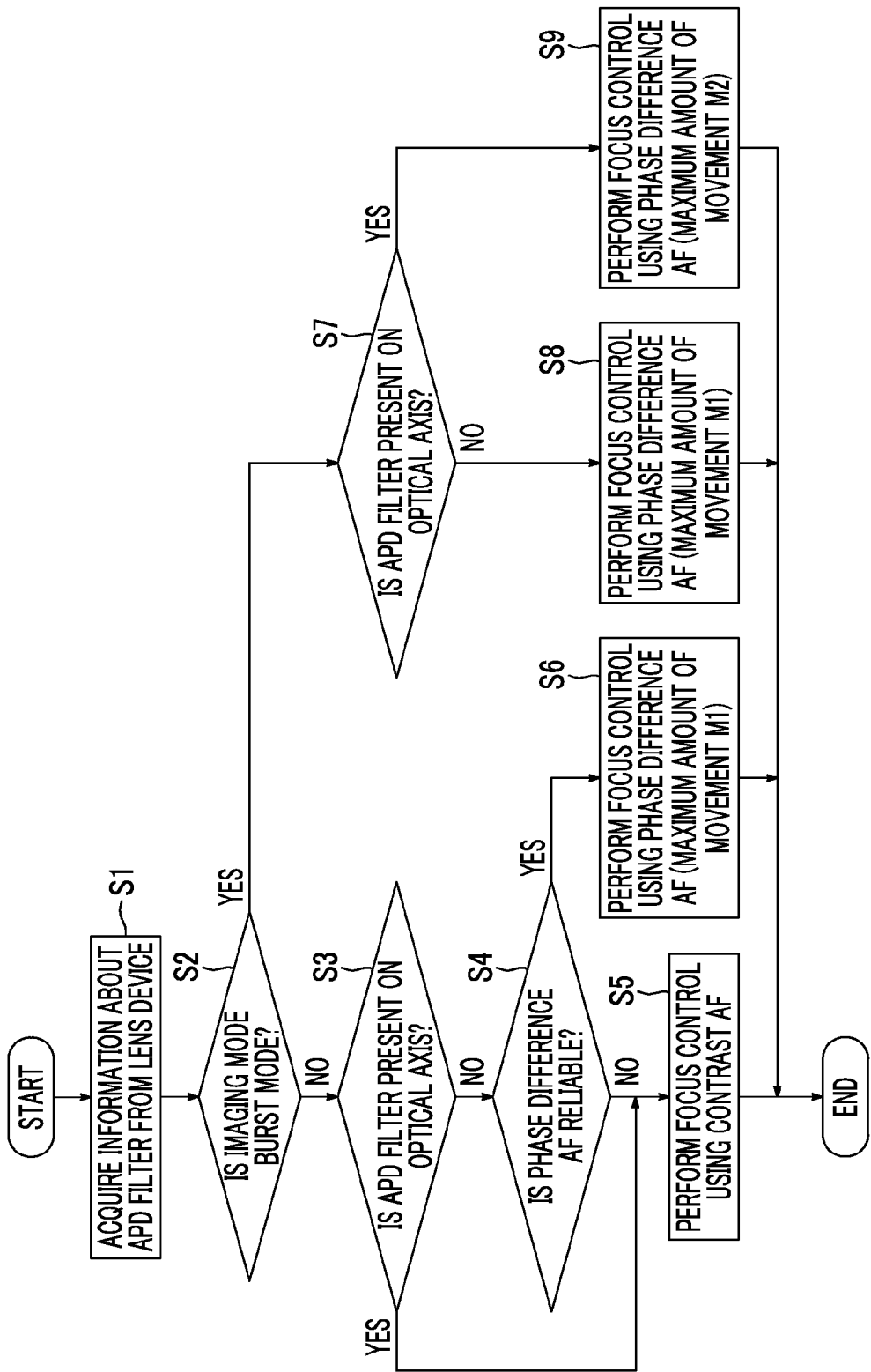
FIG. 8 is a flowchart illustrating the operation of the digital camera illustrated in FIG. 1.

FIG. 8 is a flowchart illustrating the operation of the digital camera illustrated in FIG. 1. The digital camera can be set to a single-shot mode in which the imaging element 5 captures an image of an object one time and image data captured by the one imaging operation is recorded, in response to an instruction from the user, and a burst mode (a consecutive shooting mode) in which the imaging element 5 captures an image of an object a plurality of times and image data captured by the plurality of imaging operations is recorded, in response to an instruction from the user.

When the user operates the operating unit 14 to input an instruction to perform autofocus, the system control unit 11 acquires the APD filter information including the information indicating whether the APD filter 3 is present and the information whether the APD filter 3 is present on the optical axis from the lens device 40 (Step S1).

Then, the system control unit 11 determines whether the imaging mode of the digital camera is set to the single-shot mode or the burst mode (Step S2).

In a case in which the imaging mode is set to the single-shot mode (Step S2: NO), the system control unit 11 determines whether the APD filter 3 is present on the optical axis of the lens device 40 on the basis of the APD filter information (Step S3).

When the APD filter 3 is present on the optical axis of the lens device 40 (Step S3: YES), the system control unit 11 performs the second focus control process. That is, the system control unit 11 directs the contrast AF processing unit 18 to determine the focus position and moves the focus lens to the determined focus position (Step S5).

When the APD filter 3 is not present on the optical axis of the lens device 40 (Step S3: NO), the system control unit 11 determines whether the reliability of the result of the correlation operation by the phase difference AF processing unit 19 is greater than a threshold value (Step S4).

The reliability of the result of the correlation operation is reduced, for example, in a case in which a large number of high-frequency components are included in the object captured in the AF area 53 or a case in which the brightness of the object is low. Therefore, the system control unit 11 can analyze the captured image signal obtained in the AF area 53 to determine whether the reliability of the result of the correlation operation is greater than the threshold value.

When it is determined that the reliability of the result of the correlation operation is not greater than the threshold value (phase difference AF is not reliable) (Step S4: NO), the system control unit 11 performs the second focus control process in Step S5. On the other hand, when it is determined that the reliability of the result of the correlation operation is greater than the threshold value (phase difference AF is reliable) (Step S4: YES), the system control unit 11 performs the first focus control process (Step S6).

That is, the system control unit 11 directs the phase difference AF processing unit 19 to calculate the amount of defocus and moves the focus lens on the basis of the calculated amount of defocus. In addition, the system control unit 11 sets the maximum movable amount of the focus lens to the maximum design value (M1 in FIG. 7) in the first focus control process in Step S6.

Returning to Step S2, in a case in which the imaging mode is set to the burst mode (Step S2: YES), the system control unit 11 determines whether the APD filter 3 is present on the optical axis of the lens device 40, on the basis of the APD filter information (Step S7).

When it is determined that the APD filter 3 is not present on the optical axis of the lens device 40 (Step S7: NO), the system control unit 11 performs the first focus control process in a state in which the maximum movable amount of the focus lens is set to the maximum design value (M1 in FIG. 7) (Step S8).

When it is determined that the APD filter 3 is present on the optical axis of the lens device 40 (Step S7: YES), the system control unit 11 performs the first focus control process in a state in which the maximum movable amount of the focus lens is set to a value (M2 in FIG. 7) less than the maximum design value (M1 in FIG. 7) (Step S9).

In the burst mode, the time required for the completion of focusing needs to be shorter than that in the single-shot mode. Therefore, in the burst mode, the digital camera illustrated in FIG. 1 performs the first focus control process suitable for high-speed processing. However, when the APD filter 3 is present on the optical axis, the above-mentioned problems arise in the first focus control process and the digital camera is less likely to be focused on a main object. According to the digital camera illustrated in FIG. 1, in the burst mode, the maximum movable amount of the focus lens in a state in which the APD filter 3 is present on the optical axis is less than that in a state in which the APD filter 3 is not present on the optical axis. Therefore, it is possible to solve the above-mentioned problems and to focus the digital camera on the main object.

Figure 9:
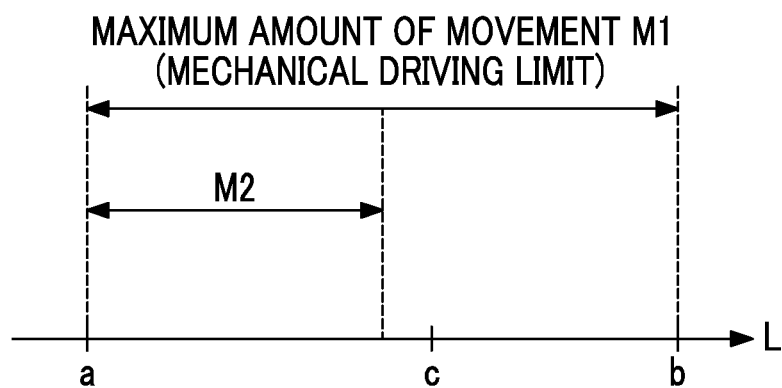
FIG. 9 is a diagram illustrating the maximum movable amount of the focus lens.

For example, the following case is considered: as illustrated in FIG. 9, the current position of the focus lens is L=a and a true focus position L=c is between L=a+M2 and L=b. It is assumed that the maximum movable amount is limited to M2. Even if the amount of defocus is M1, the focus lens is moved to a position L=M2 and does not pass the true focus position.

On the other hand, in a case in which the maximum movable amount is set to M1, the focus lens passes the true focus position L=c and is moved to the vicinity of the position L=b. In this state, the amount of defocus is further calculated. When the focus lens is moved on the basis of the amount of defocus, the distance between the true focus position and the focus lens increases. Therefore, the amount of defocus increases and the focus lens is likely to pass the position L=c again.

When the maximum movable amount is set to M2, the possibility that the focus lens will be unnecessarily moved away from the true focus position can be reduced. Therefore, in the burst mode, the focus lens can be moved to the true focus position by a smaller number of imaging operations than that when the maximum movable amount is set to M1. In addition, it is possible to reduce the amount of noise or power consumption when the focus lens is moved.

The system control unit 11 may set the maximum movable amount on the basis of the position of the focus lens at the initial imaging start time when the imaging mode is set to the burst mode. For example, when the position of the focus lens at a burst shooting start time is the position a in FIG. 7, the range of the maximum movable amount is set to M2. When the focus lens is located between the position a and an intermediate position between the positions a and b in FIG. 7 at the burst shooting start time, the maximum movable amount is set to a value (for example, about 80% of M2) less than M2. In this way, the focus lens can be moved to the true focus position by a small number of imaging operations.

The system control unit 11 may select the value of the maximum movable amount of the focus lens, which is set in a state in which the APD filter 3 is present on the optical axis of the lens device 40, from a plurality of values and then set the selected value.

For example, the system control unit 11 selects the value of the maximum movable amount of the focus lens, which is set in a state in which the APD filter 3 is present on the optical axis of the lens device 40, to a value corresponding to the captured scene set in the digital camera among a plurality of values.

Specifically, in a case in which the object is a person (moving body), the system control unit 11 estimates the moving distance of the person during burst shooting (for example, a maximum distance of 50 cm) and sets the maximum movable amount of the focus lens to the amount of driving of the lens corresponding to the distance. In a case in which the object is a landscape (fixed body), since the object hardly moves, the system control unit 11 sets the maximum movable amount of the focus lens to a value less than that when the object is a person.

Alternatively, the system control unit 11 sets the value of the maximum movable amount of the focus lens, which is set in a state in which the APD filter 3 is present on the optical axis of the lens device 40, to a larger value as the zoom magnification of the lens device 40 becomes higher.

For example, when the zoom magnification is high as in telephoto shooting, only a central portion of the imaging lens is used to capture an image. Therefore, the effect of the APD filter 3 is substantially small. That is, the influence of the error of the result of the correlation operation is expected to be small. For this reason, when the zoom magnification is high, the system control unit 11 sets the maximum movable amount of the focus lens to a value greater than that when the zoom magnification is low. Conversely, when the zoom magnification is low, the system control unit 11 sets the maximum movable amount of the focus lens to a value less than that when the zoom magnification is high.

Alternatively, the system control unit 11 sets the value of the maximum movable amount of the focus lens, which is set in a state in which the APD filter 3 is present on the optical axis of the lens device 40, to a larger value as the amount of defocus which is calculated first by the phase difference AF processing unit 19 after an autofocus execution instruction is issued becomes smaller.

The amount of defocus which is calculated first by the phase difference AF processing unit 19 after the autofocus execution instruction is issued corresponds to the distance between the digital camera and the main object at the time the autofocus execution instruction is issued. The distance is likely to include an error. In a case in which the distance is small, that is, in a case in which the amount of defocus is small, it is possible to move the focus lens to the true focus position even if the maximum movable amount of the focus lens is a little large. Therefore, as the amount of defocus becomes small, the maximum movable amount of the focus lens is set to a larger value.

As such, as the maximum movable amount of the focus lens, an optimum value corresponding to the situation is selected from a plurality of values and is then set. Therefore, it is possible to effectively reduce the time required for the completion of focusing.

The digital camera illustrated in FIG. 1 may not include the contrast AF processing unit 18. In the case of this structure, the system control unit 11 performs only the first focus control process. For the operation of the digital camera having this structure, Steps S2 to S6 are removed in the flowchart illustrated in FIG. 8 and Step S7 and the subsequent steps are performed after Step S1. That is, the process from Step S7 to Step S9 is always performed, regardless of whether the imaging mode is the burst mode or the single-shot mode.

In the flowchart illustrated in FIG. 8, Step S4 may be omitted. That is, when the determination result in Step S3 is NO, Step S6 may be performed. When the determination result in Step S3 is YES, Step S5 may be performed.

Figure 10:
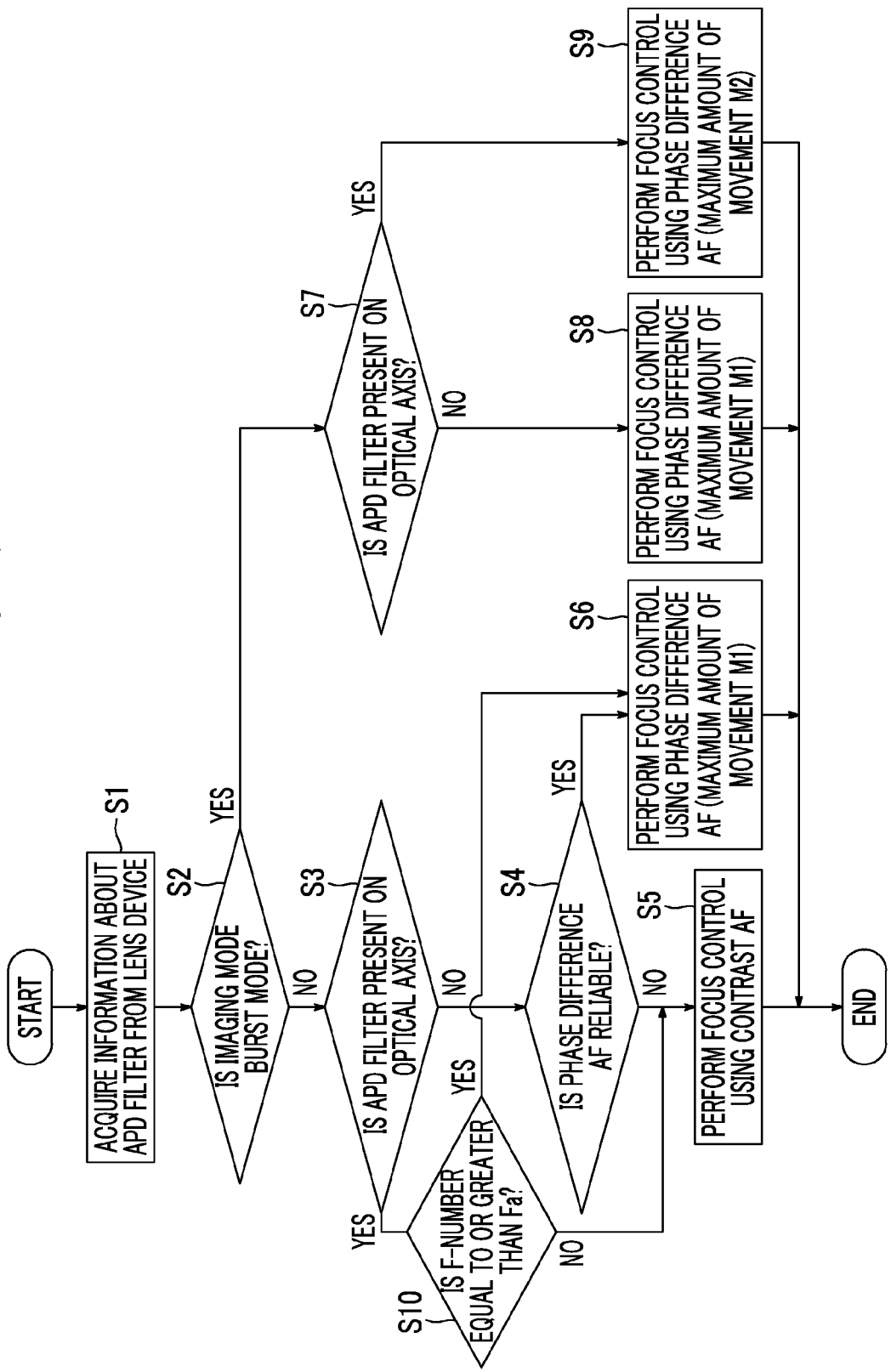
FIG. 10 is a flowchart illustrating a modification example of the operation of the digital camera illustrated in FIG. 1.

FIG. 10 is a flowchart illustrating a modification example of the operation of the digital camera illustrated in FIG. 1. In FIG. 10, the same steps as those in FIG. 8 are denoted by the same reference numerals and the description thereof will not be repeated.

When the determination result in Step S3 is YES, the system control unit 11 acquires information about the F-number of the diaphragm 2 which is set as an imaging condition. When the F-number is equal to or greater than a threshold value Fa (Step S10: YES), the system control unit 11 performs the first focus control process in Step S6. When the F-number is less than the threshold value Fa (Step S10: NO), the system control unit 11 performs the second focus control process in Step S5. In the burst mode, high-speed processing is required regardless of the magnitude of the F-number. Therefore, Step S7 and the subsequent steps are performed at all of the F-numbers which can be set.

As the F-number increases, the incident angle (an incident angle when an angle in a direction perpendicular to the light receiving surface is 0 degrees) of a light beam on the imaging element 5 decreases. Therefore, even in a state in which the APD filter 3 is present on the optical axis, the reliability of the result of the correlation operation is higher than that when the F-number is small. In the modification example illustrated in FIG. 10, Step S6 is performed when the F-number is equal to or greater than the threshold value Fa. Therefore, the speed and accuracy of focus control can be higher than those in the operation illustrated in FIG. 9.

The optimum value of the threshold value Fa which is set in Step S10 of FIG. 10 varies depending on the characteristics of the APD filter 3. Therefore, table data in which the identification information of the APD filter 3 is associated with the threshold value Fa is stored in a memory (the main memory 16 or the recording medium 21) in advance and the system control unit 11 reads the threshold value Fa corresponding to the APD filter 3 provided in the mounted lens device 40 from the memory and sets the threshold value Fa. The table data may be stored as the APD filter information in the memory of the lens device 40.

In the flowcharts illustrated in FIGS. 8 and 10, when the determination result in Step S2 is YES, that is, when the imaging mode is the burst mode, the system control unit 11 may perform the second focus control process for the first imaging operation among a plurality of imaging operations and may perform Step S7 and the subsequent steps for the second and subsequent imaging operations. The first imaging operation has some time to spare in the burst mode. Therefore, when the second focus control process is performed for the first imaging operation, it is possible to improve the accuracy of the first focus control process in the second and subsequent imaging operations.

The digital camera has been described above as an example of the imaging device. Next, an embodiment of a smart phone with a camera as the imaging device will be described.

Figure 11:
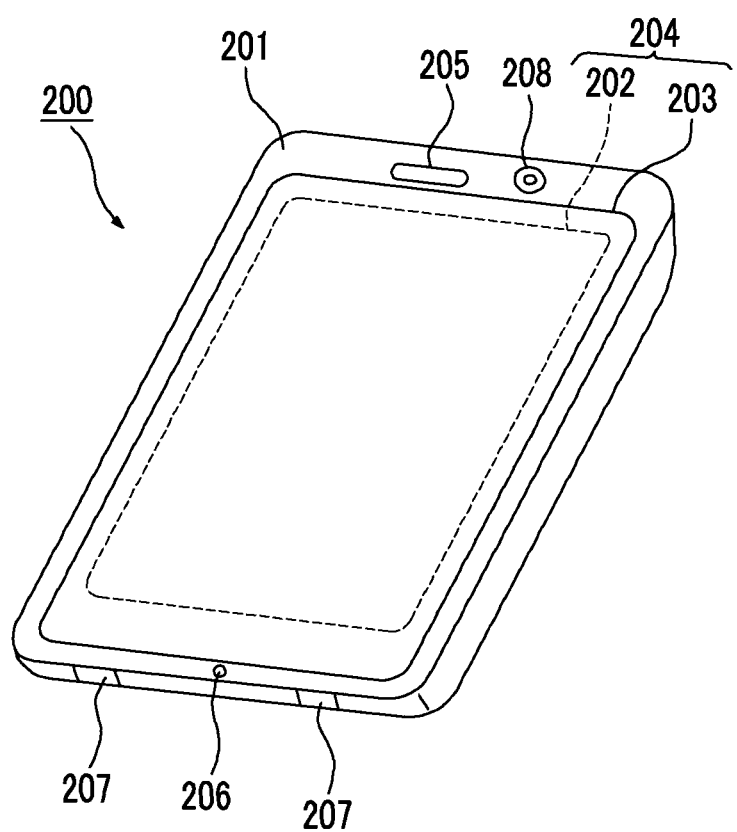
FIG. 11 is a diagram illustrating the structure of a smart phone.

FIG. 11 is a diagram illustrating the outward appearance of a smart phone 200 which is an embodiment of the imaging device according to the invention. The smart phone 200 illustrated in FIG. 11 comprises a housing 201 with a flat panel shape and a display input unit 204 having a display panel 202 as a display unit and an operation panel 203 as an input unit which are integrally formed on one surface of the housing 201. The housing 201 comprises a speaker 205, a microphone 206, an operating unit 207, and a camera unit 208. However, the configuration of the housing 201 is not limited thereto. For example, the display unit and the input unit may be independently provided, or the housing 201 may have a folding structure or a sliding structure.

Figure 12:
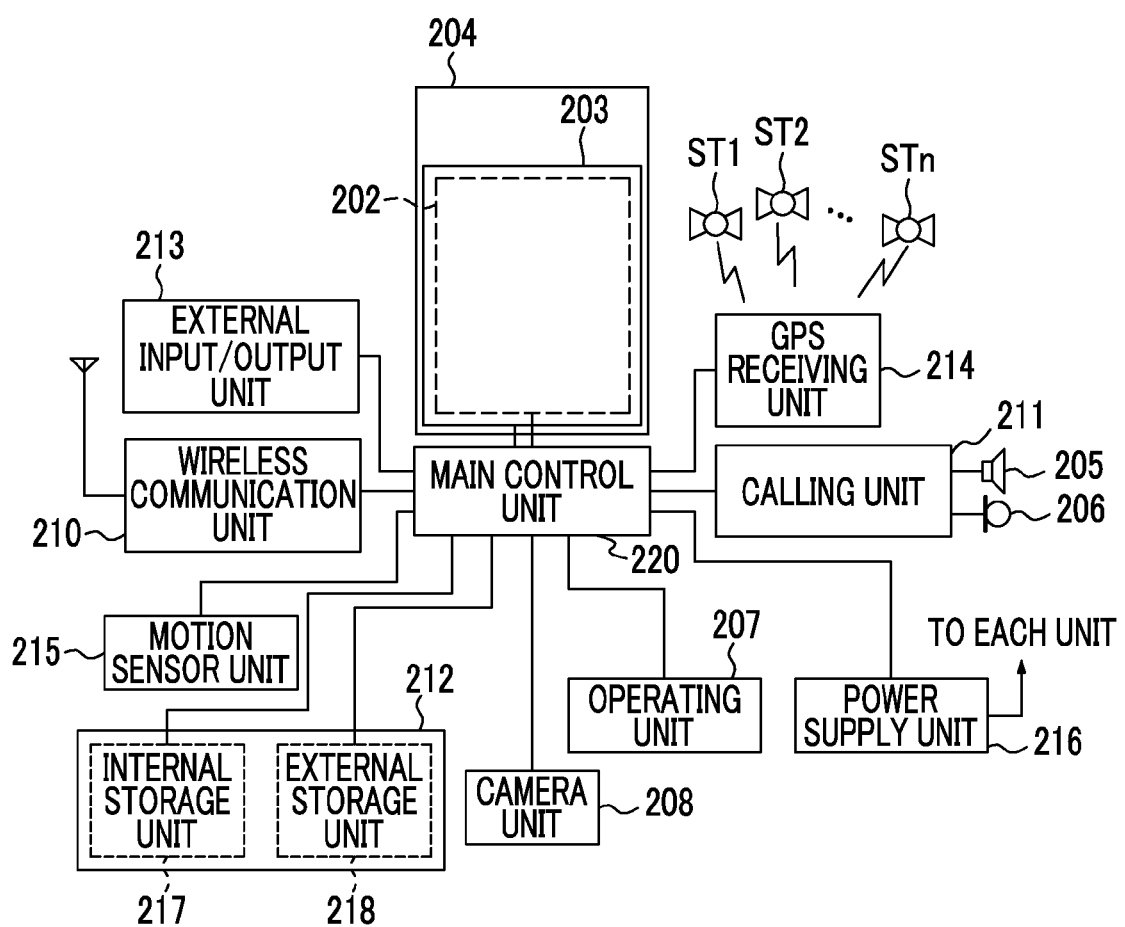
FIG. 12 is a block diagram illustrating the internal structure of the smart phone illustrated in FIG. 11.

FIG. 12 is a block diagram illustrating the structure of the smart phone 200 illustrated in FIG. 11. As illustrated in FIG. 12, the smart phone 200 comprises, as main components, a wireless communication unit 210, the display input unit 204, a calling unit 211, the operating unit 207, the camera unit 208, a storage unit 212, an external input/output unit 213, a global positioning system (GPS) receiving unit 214, a motion sensor unit 215, a power supply unit 216, and a main control unit 220. In addition, the smart phone 200 has, as a main function, a wireless communication function which performs mobile wireless communication through a base station apparatus BS (not illustrated) and a mobile communication network NW (not illustrated).

The wireless communication unit 210 performs wireless communication with the base station apparatus BS which is accommodated in the mobile communication network NW in response to an instruction from the main control unit 220. The wireless communication is used to transmit and receive various types of file data, such as voice data and image data, and electronic mail data or to receive, for example, web data or streaming data.

The display input unit 204 is a so-called touch panel that displays, for example, images (still images and moving images) or text information to visually transmit information to the user and detects the user's operation for the displayed information under the control of the main control unit 220 and comprises the display panel 202 and the operation panel 203.

The display panel 202 uses, for example, a liquid crystal display (LCD) or an organic electro-luminescence display (OELD) as a display device.

The operation panel 203 is a device that is provided such that an image displayed on a display surface of the display panel 202 is visually recognized and detects one or a plurality of coordinate points operated by a finger of the user or a stylus. When the device is operated by a finger of the user or a stylus, a detection signal which is generated by the operation is output to the main control unit 220. Then, the main control unit 220 detects an operation position (coordinates) on the display panel 202 on the basis of the received detection signal.

As illustrated in FIG. 11, the display panel 202 and the operation panel 203 of the smart phone 200 which is described as an embodiment of the imaging device according to the invention are integrated to form the display input unit 204 and the operation panel 203 is provided so as to completely cover the display panel 202.

In a case in which this arrangement is used, the operation panel 203 may have a function of detecting the user's operation even in a region other than the display panel 202. In other words, the operation panel 203 may comprise a detection region (hereinafter, referred to as a display region) for an overlap portion which overlaps the display panel 202 and a detection region (hereinafter, referred to as a non-display region) for an outer edge portion which does not overlap the display panel 202.

The size of the display region may be exactly equal to the size of the display panel 202. However, the sizes are not necessarily equal to each other. The operation panel 203 may comprise two sensitive regions, that is, an outer edge portion and an inner portion other than the outer edge portion. The width of the outer edge portion is appropriately designed according to, for example, the size of the housing 201. Examples of a position detecting method which is used in the operation panel 203 include a matrix switching method, a resistive film method, a surface elastic wave method, an infrared method, an electromagnetic induction method, and a capacitive sensing method. Any of the methods may be used.

The calling unit 211 comprises the speaker 205 and the microphone 206. The calling unit 211 converts the voice of the user which is input through the microphone 206 into voice data which can be processed by the main control unit 220 and outputs the converted voice data to the main control unit 220. In addition, the calling unit 211 decodes voice data received by the wireless communication unit 210 or the external input/output unit 213 and outputs the decoded voice data from the speaker 205. As illustrated in FIG. 11, for example, the speaker 205 can be mounted on the same surface as the display input unit 204 and the microphone 206 can be mounted on a side surface of the housing 201.

The operating unit 207 is a hardware key which uses, for example, a key switch and receives instructions from the user. For example, as illustrated in FIG. 11, the operating unit 207 is a push button switch which is mounted on a side surface of the housing 201 of the smart phone 200, is turned on when it is pressed by, for example, a finger, and is turned off by the restoring force of a spring when the finger is taken off.

The storage unit 212 stores a control program or control data of the main control unit 220, application software, address data which is associated with, for example, the names or phone numbers of communication partners, and transmitted and received electronic mail data, web data which is downloaded by web browsing, or downloaded content data. In addition, the storage unit 212 temporarily stores, for example, streaming data. The storage unit 212 includes an internal storage unit 217 which is provided in the smart phone and an external storage unit 218 which has an attachable and detachable external memory slot. The internal storage unit 217 and the external storage unit 218 forming the storage unit 212 may be implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 213 functions as an interface with all of the external apparatuses connected to the smart phone 200 and is directly or indirectly connected to other external apparatuses by communication (for example, universal serial bus (USB) communication or IEEE1394) or a network (for example, the Internet, a wireless LAN, a Bluetooth (registered trademark) network, a radio frequency identification (RFID) network, an infrared data association (IrDA (registered trademark)) network, an ultra wideband (UWB) (registered trademark) network or a ZigBee (registered trademark) network).

Examples of the external apparatus connected to the smart phone 200 include a wired/wireless headset, a wired/wireless external charger, a wired/wireless data port, a memory card which is connected through a card socket, a subscriber identity module (SIM)/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a PDA which is connected wirelessly or in a wired manner, and an earphone which is connected wirelessly or in a wired manner. The external input/output unit 213 can transmit data which is received from the external apparatus to each component of the smart phone 200 or can transmit data in the smart phone 200 to the external apparatus.

The GPS receiving unit 214 receives GPS signals transmitted from GPS satellites ST1 to STn and performs a position measurement process on the basis of a plurality of received GPS signals to detect a position including the latitude, longitude, and height of the smart phone 200, in response to an instruction from the main control unit 220. When the GPS receiving unit 214 can acquire positional information from the wireless communication unit 210 or the external input/output unit 213 (for example, a wireless LAN), it can detect the position using the positional information.

The motion sensor unit 215 comprises, for example, a triaxial acceleration sensor and detects the physical movement of the smart phone 200 in response to an instruction from the main control unit 220. When the physical movement of the smart phone 200 is detected, the moving direction or acceleration of the smart phone 200 is detected. The detection result is output to the main control unit 220.

The power supply unit 216 supplies power which is stored in a battery (not illustrated) to each unit of the smart phone 200 in response to an instruction from the main control unit 220.

The main control unit 220 comprises a microprocessor, operates on the basis of the control program or control data stored in the storage unit 212, and controls the overall operation of each unit of the smart phone 200. The main control unit 220 has an application processing function and a mobile communication control function of controlling each unit of a communication system in order to perform voice communication or data communication through the wireless communication unit 210.

The application processing function is implemented by the operation of the main control unit 220 based on the application software which is stored in the storage unit 212. Examples of the application processing function include an infrared communication function which controls the external input/output unit 213 such that data communication with an opposing apparatus is performed, an electronic mail function which transmits and receives electronic mail, and a web browsing function which browses web pages.

The main control unit 220 has, for example, an image processing function which displays an image on the display input unit 204 on the basis of image data (data of a still image or a moving image) such as received data or downloaded streaming data. The image processing function means the function of the main control unit 220 decoding the image data, performing image processing on the decoding result, and displaying the image on the display input unit 204.

The main control unit 220 performs display control for the display panel 202 and operation detection control for detecting the operation of the user through the operating unit 207 and the operation panel 203. The main control unit 220 performs the display control to display a software key, such as an icon for starting application software or a scroll bar, or to display a window for creating electronic mail. The scroll bar means a software key for receiving an instruction to move a displayed portion of an image that is too large to fit into the display region of the display panel 202.

The main control unit 220 performs the operation detection control to detect the operation of the user input through the operating unit 207, to receive an operation for the icon or the input of a character string to an input field of the window through the operation panel 203, or to receive a request to scroll the displayed image through the scroll bar.

In addition, the main control unit 220 has a touch panel control function that performs the operation detection control to determine whether the position of an operation for the operation panel 203 is an overlap portion (display region) which overlaps the display panel 202 or an outer edge portion (non-display region) which does not overlap the display panel 202 other than the overlap portion and controls a sensitive region of the operation panel 203 or the display position of the software key.

The main control unit 220 can detect a gesture operation for the operation panel 203 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 208 includes components other than the external memory control unit 20, the recording medium 21, the display control unit 22, the display unit 23, and the operating unit 14 of the digital camera illustrated in FIG. 1.

The image data captured by the camera unit 208 can be recorded in the storage unit 212 or can be output through the external input/output unit 213 or the wireless communication unit 210.

In the smart phone 200 illustrated in FIG. 11, the camera unit 208 is mounted on the same surface as the display input unit 204. However, the mounting position of the camera unit 208 is not limited thereto. For example, the camera unit 208 may be mounted on the rear surface of the display input unit 204.

The camera unit 208 can be used for various functions of the smart phone 200. For example, the image acquired by the camera unit 208 can be displayed on the display panel 202 or the image acquired by the camera unit 208 can be used as one of the operation inputs of the operation panel 203.

When the GPS receiving unit 214 detects the position, the position may be detected with reference to the image from the camera unit 208. In addition, the optical axis direction of the camera unit 208 in the smart phone 200 may be determined or the current usage environment may be determined, with reference to the image from the camera unit 208, using the triaxial acceleration sensor or without using the triaxial acceleration sensor. Of course, the image from the camera unit 208 may be used in the application software.

For example, the positional information which is acquired by the GPS receiving unit 214, the voice information which is acquired by the microphone 206 (for example, the main control unit may convert the voice information into text information), and the posture information which is acquired by the motion sensor unit 215 may be added to the image data of a still image or a moving image and the image data may be recorded in the storage unit 212 and may be output through the external input/output unit 213 or the wireless communication unit 210.

In the smart phone 200 having the above-mentioned structure, accessories that can mount the lens device 40 including the APD filter 3 can be provided, the imaging element 5 can be used as an imaging element of the camera unit 208, and high-accuracy focus control can be performed by the processes illustrated in FIGS. 8 and 10.

As described above, the specification discloses the following.

A disclosed imaging device comprises an imaging element that captures an image of an object through an imaging optical system including a focus lens and a phase difference AF control unit that performs a first focus control process which calculates an amount of defocus on the basis of an image signal captured by the imaging element, using a phase difference AF system, and moves the focus lens in an optical axis direction on the basis of the calculated amount of defocus. In a state in which an optical filter, of which transmittance is reduced as a distance from the center of an optical axis of the imaging optical system in a direction perpendicular to the optical axis increases, is present on the optical axis of the imaging optical system, the phase difference AF control unit performs a focus lens movement amount setting process that sets the maximum movable amount of the focus lens to one side of the optical axis direction to a value that is smaller than that in a state in which the optical filter is not present on the optical axis of the imaging optical system and moves the focus lens in the range of the set maximum movable amount during the first focus control process.

According to this structure, the amount of movement of the focus lens is less than the set maximum movable amount even in a situation in which an error occurs in the calculated amount of defocus and the focus lens needs to be moved by a distance greater than the set maximum movable amount. Therefore, the possibility that the focus lens will be close to the true focus position is high and the focus lens is moved so as to be focused. Therefore, it is possible to reduce the error in the amount of defocus which is calculated in the subsequent process. That is, the calculation of the amount of defocus and the movement of the focus lens based on the calculated amount of defocus can be repeated to move the focus lens close to the true focus position at a high speed. Finally, it is possible to move the focus lens to the true focus position.

In the disclosed imaging device, the phase difference AF control unit selects a value of the maximum movable amount that is set in the state in which the optical filter is present on the optical axis of the imaging optical system from a plurality of values and sets the selected value.

According to this structure, it is possible to set the optimum value of the maximum movable amount according to, for example, the imaging conditions. Therefore, it is possible to effectively reduce the time required for the completion of focusing.

In the disclosed imaging device, the phase difference AF control unit sets, as the maximum movable amount, a value corresponding to a set scene to be captured, a zoom magnification of the imaging optical system, or the amount of defocus which is calculated first after an autofocus instruction is issued, among the plurality of values.

According to this structure, it is possible to set the optimum value of the maximum movable amount according to, for example, the imaging conditions. Therefore, it is possible to effectively reduce the time required for the completion of focusing.

In the disclosed imaging device, the phase difference AF control unit performs the first focus control process and the focus lens movement amount setting process in a burst mode in which the imaging element continuously captures the image of the object a plurality of times and captured image data obtained by each of the plurality of imaging operations is recorded.

According to this structure, it is possible to move the focus lens to the true focus position at a high speed in the burst mode and to obtain an image that is in focus in an early stage during burst shooting.

The disclosed imaging device further comprises a contrast AF control unit that performs a second focus control process which calculates a focus position on the basis of the captured image signal obtained by the imaging element through the imaging optical system, using a contrast AF system, and moves the focus lens to the calculated focus position. In the burst mode in which the imaging element continuously captures the image of the object a plurality of times and captured image data obtained by each of the plurality of imaging operations is recorded, the contrast AF control unit performs the second focus control for a first imaging operation among the plurality of imaging operations and the first focus control process and the focus lens movement amount setting process are performed for the second and subsequent imaging operations among the plurality of imaging operations.

According to this structure, in the first imaging operation in the burst mode, focus control can be accurately performed by the second focus control process using the contrast AF system. Therefore, in the second and subsequent imaging operations, it is possible to reduce the amount of movement of the focus lens and to obtain an image that is in focus in an early stage.

The disclosed imaging device further comprises a contrast AF control unit that performs a second focus control process which calculates a focus position on the basis of the captured image signal obtained by the imaging element through the imaging optical system, using a contrast AF system, and moves the focus lens to the calculated focus position. In the state in which the optical filter is present on the optical axis of the imaging optical system, the first focus control process and the focus lens movement amount setting process are performed at all of F-numbers that can be set, in the burst mode in which the imaging element continuously captures the image of the object a plurality of times and captured image data obtained by each of the plurality of imaging operations is recorded. In a single-shot mode in which the imaging element captures the image of the object one time and captured image data obtained by the one imaging operation is recorded, the second focus control process is performed in a case in which the F-number is less than a threshold value and the first focus control process is performed in a case in which the F-number is equal to or greater than the threshold value.

According to this structure, since the phase difference AF control unit performs the first focus control process in the burst mode, it is possible to perform focus control that follows a burst shooting speed. In the single-shot mode, in a case in which the F-number is less than the threshold value, the contrast AF control unit performs the second focus control process. Therefore, it is possible to ensure the accuracy of focusing in a case in which the F-number is small.

A disclosed focus control method that is performed by an imaging device including an imaging element that captures an image of an object through an imaging optical system including a focus lens comprises a phase difference AF control step of performing a first focus control process which calculates an amount of defocus on the basis of an image signal captured by the imaging element, using a phase difference AF system, and moves the focus lens in an optical axis direction on the basis of the calculated amount of defocus. In the phase difference AF control step, in a state in which an optical filter, of which the transmittance is reduced as a distance from the center of an optical axis of the imaging optical system in a direction perpendicular to the optical axis increases, is present on the optical axis of the imaging optical system, a focus lens movement amount setting process that sets the maximum movable amount of the focus lens to one side of the optical axis direction to a value that is smaller than that in a state in which the optical filter is not present on the optical axis of the imaging optical system is performed to move the focus lens in the range of the set maximum movable amount.

In the disclosed focus control method performed by the imaging device, in the phase difference AF control step, a value of the maximum movable amount that is set in the state in which the optical filter is present on the optical axis of the imaging optical system is selected from a plurality of values and the selected value is set.

In the disclosed focus control method performed by the imaging device, in the phase difference AF control step, among the plurality of values, a value corresponding to a set scene to be captured, a zoom magnification of the imaging optical system, or the amount of defocus which is calculated first after an autofocus instruction is issued is set as the maximum movable amount.

In the disclosed focus control method performed by the imaging device, in the phase difference AF control unit step, the first focus control process and the focus lens movement amount setting process are performed in the burst mode in which the imaging element continuously captures the image of the object a plurality of times and captured image data obtained by each of the plurality of imaging operations is recorded.

The disclosed focus control method performed by the imaging device further comprises a contrast AF control step of performing a second focus control process which calculates a focus position on the basis of the captured image signal obtained by the imaging element through the imaging optical system, using a contrast AF system, and moves the focus lens to the calculated focus position. In the burst mode in which the imaging element continuously captures the image of the object a plurality of times and captured image data obtained by each of the plurality of imaging operations is recorded, the second focus control process in the contrast AF control step is performed for a first imaging operation among the plurality of imaging operations and the first focus control process and the focus lens movement amount setting process are performed for the second and subsequent imaging operations among the plurality of imaging operations.

The disclosed focus control method performed by the imaging device further comprises a contrast AF control step of performing a second focus control process which calculates a focus position on the basis of the captured image signal obtained by the imaging element through the imaging optical system, using a contrast AF system, and moves the focus lens to the calculated focus position. In the state in which the optical filter is present on the optical axis of the imaging optical system, the first focus control process and the focus lens movement amount setting process are performed at all of F-numbers that can be set, in the burst mode in which the imaging element continuously captures the image of the object a plurality of times and captured image data obtained by each of the plurality of imaging operations is recorded. In a single-shot mode in which the imaging element captures the image of the object one time and captured image data obtained by the one imaging operation is recorded, the second focus control process is performed in a case in which the F-number is less than a threshold value and the first focus control process is performed in a case in which the F-number is equal to or greater than the threshold value.

INDUSTRIAL APPLICABILITY

The invention is particularly applied to, for example, digital cameras and is convenient and effective.

The invention has been described in detail above with reference to a specific embodiment. However, it will be understood by those skilled in the art that various modifications and changes of the invention can be made without departing from the scope and spirit of the invention.

This application is based on JP2014-183532 filed Sep. 9, 2014, the content of which is incorporated herein by reference.

EXPLANATION OF REFERENCES

1: imaging lens
2: diaphragm
3: APD filter
5: imaging element
11: system control unit
18: contrast AF processing unit
19: phase difference AF processing unit
50: light receiving surface
51: pixel
52, 52A, 52B: phase difference detection pixel
53: AF area

What is claimed is:

1. An imaging device comprising:
an imaging element that captures an image of an object through an imaging optical system including a focus lens; and
a phase difference AF control unit that performs a first focus control process which calculates an amount of defocus based on an image signal captured by the imaging element, using a phase difference AF system, and moves the focus lens in an optical axis direction based on the calculated amount of defocus,
wherein, in a state in which an optical filter, of which transmittance is reduced as a distance from a center of an optical axis of the imaging optical system in a direction perpendicular to the optical axis increases, is present on the optical axis of the imaging optical system, the phase difference AF control unit performs a focus lens movement amount setting process that sets a maximum movable amount of the focus lens to one side of the optical axis direction to a value that is smaller than that in a state in which the optical filter is not present on the optical axis of the imaging optical system and moves the focus lens in a range of the set maximum movable amount during the first focus control process.

2. The imaging device according to claim 1,
wherein the phase difference AF control unit selects a value of the maximum movable amount that is set in the state in which the optical filter is present on the optical axis of the imaging optical system from a plurality of values and sets the selected value.

3. The imaging device according to claim 2,
wherein the phase difference AF control unit sets, as the maximum movable amount, a value corresponding to a set scene to be captured, a zoom magnification of the imaging optical system, or the amount of defocus which is calculated first after an autofocus instruction is issued, among the plurality of values.

4. The imaging device according to claim 1,
wherein the phase difference AF control unit performs the first focus control process and the focus lens movement amount setting process in a burst mode in which the imaging element continuously captures the image of the object a plurality of times and captured image data obtained by each of the plurality of imaging operations is recorded.

5. The imaging device according to claim 2,
wherein the phase difference AF control unit performs the first focus control process and the focus lens movement amount setting process in a burst mode in which the imaging element continuously captures the image of the object a plurality of times and captured image data obtained by each of the plurality of imaging operations is recorded.

6. The imaging device according to claim 3,
wherein the phase difference AF control unit performs the first focus control process and the focus lens movement amount setting process in a burst mode in which the imaging element continuously captures the image of the object a plurality of times and captured image data obtained by each of the plurality of imaging operations is recorded.

7. The imaging device according to claim 1, further comprising:
a contrast AF control unit that performs a second focus control process which calculates a focus position based on the captured image signal obtained by the imaging element through the imaging optical system, using a contrast AF system, and moves the focus lens to the calculated focus position,
wherein, in a burst mode in which the imaging element continuously captures the image of the object a plurality of times and captured image data obtained by each of the plurality of imaging operations is recorded, the contrast AF control unit performs the second focus control for a first imaging operation among the plurality of imaging operations and the first focus control process and the focus lens movement amount setting process are performed for the second and subsequent imaging operations among the plurality of imaging operations.

8. The imaging device according to claim 2, further comprising:
a contrast AF control unit that performs a second focus control process which calculates a focus position based on the captured image signal obtained by the imaging element through the imaging optical system, using a contrast AF system, and moves the focus lens to the calculated focus position,
wherein, in a burst mode in which the imaging element continuously captures the image of the object a plurality of times and captured image data obtained by each of the plurality of imaging operations is recorded, the contrast AF control unit performs the second focus control for a first imaging operation among the plurality of imaging operations and the first focus control process and the focus lens movement amount setting process are performed for the second and subsequent imaging operations among the plurality of imaging operations.

9. The imaging device according to claim 3, further comprising:
a contrast AF control unit that performs a second focus control process which calculates a focus position based on the captured image signal obtained by the imaging element through the imaging optical system, using a contrast AF system, and moves the focus lens to the calculated focus position,
wherein, in a burst mode in which the imaging element continuously captures the image of the object a plurality of times and captured image data obtained by each of the plurality of imaging operations is recorded, the contrast AF control unit performs the second focus control for a first imaging operation among the plurality of imaging operations and the first focus control process and the focus lens movement amount setting process are performed for the second and subsequent imaging operations among the plurality of imaging operations.

10. The imaging device according to claim 1, further comprising:
a contrast AF control unit that performs a second focus control process which calculates a focus position based on the captured image signal obtained by the imaging element through the imaging optical system, using a contrast AF system, and moves the focus lens to the calculated focus position,
wherein, in the state in which the optical filter is present on the optical axis of the imaging optical system, the first focus control process and the focus lens movement amount setting process are performed at all of F-numbers that can be set, in a burst mode in which the imaging element continuously captures the image of the object a plurality of times and captured image data obtained by each of the plurality of imaging operations is recorded, and
in a single-shot mode in which the imaging element captures the image of the object one time and captured image data obtained by the one imaging operation is recorded, the second focus control process is performed in a case in which the F-number is less than a threshold value and the first focus control process is performed in a case in which the F-number is equal to or greater than the threshold value.

11. The imaging device according to claim 2, further comprising:
a contrast AF control unit that performs a second focus control process which calculates a focus position based on the captured image signal obtained by the imaging element through the imaging optical system, using a contrast AF system, and moves the focus lens to the calculated focus position,
wherein, in the state in which the optical filter is present on the optical axis of the imaging optical system, the first focus control process and the focus lens movement amount setting process are performed at all of F-numbers that can be set, in a burst mode in which the imaging element continuously captures the image of the object a plurality of times and captured image data obtained by each of the plurality of imaging operations is recorded, and
in a single-shot mode in which the imaging element captures the image of the object one time and captured image data obtained by the one imaging operation is recorded, the second focus control process is performed in a case in which the F-number is less than a threshold value and the first focus control process is performed in a case in which the F-number is equal to or greater than the threshold value.

12. The imaging device according to claim 3, further comprising:
a contrast AF control unit that performs a second focus control process which calculates a focus position based on the captured image signal obtained by the imaging element through the imaging optical system, using a contrast AF system, and moves the focus lens to the calculated focus position,
wherein, in the state in which the optical filter is present on the optical axis of the imaging optical system, the first focus control process and the focus lens movement amount setting process are performed at all of F-numbers that can be set, in a burst mode in which the imaging element continuously captures the image of the object a plurality of times and captured image data obtained by each of the plurality of imaging operations is recorded, and in a single-shot mode in which the imaging element captures the image of the object one time and captured image data obtained by the one imaging operation is recorded, the second focus control process is performed in a case in which the F-number is less than a threshold value and the first focus control process is performed in a case in which the F-number is equal to or greater than the threshold value.

13. The imaging device according to claim 4, further comprising:

a contrast AF control unit that performs a second focus control process which calculates a focus position based on the captured image signal obtained by the imaging element through the imaging optical system, using a contrast AF system, and moves the focus lens to the calculated focus position, wherein, in the state in which the optical filter is present on the optical axis of the imaging optical system, the first focus control process and the focus lens movement amount setting process are performed at all of F-numbers that can be set, in a burst mode in which the imaging element continuously captures the image of the object a plurality of times and captured image data obtained by each of the plurality of imaging operations is recorded, and in a single-shot mode in which the imaging element captures the image of the object one time and captured image data obtained by the one imaging operation is recorded, the second focus control process is performed in a case in which the F-number is less than a threshold value and the first focus control process is performed in a case in which the F-number is equal to or greater than the threshold value.

14. A focus control method that is performed by an imaging device including an imaging element that captures an image of an object through an imaging optical system including a focus lens, the method comprising:

a phase difference AF control step of performing a first focus control process which calculates an amount of defocus based on an image signal captured by the imaging element, using a phase difference AF system, and moves the focus lens in an optical axis direction based on the calculated amount of defocus, wherein, in the phase difference AF control step, in a state in which an optical filter, of which transmittance is reduced as a distance from a center of an optical axis of the imaging optical system in a direction perpendicular to the optical axis increases, is present on the optical axis of the imaging optical system, a focus lens movement amount setting process that sets a maximum movable amount of the focus lens to one side of the optical axis direction to a value that is smaller than that in a state in which the optical filter is not present on the optical axis of the imaging optical system is performed to move the focus lens in a range of the set maximum movable amount.

15. The focus control method according to claim 14, wherein, in the phase difference AF control step, a value of the maximum movable amount that is set in the state in which the optical filter is present on the optical axis of the imaging optical system is selected from a plurality of values and the selected value is set.

16. The focus control method according to claim 15, wherein, in the phase difference AF control step, among the plurality of values, a value corresponding to a set scene to be captured, a zoom magnification of the imaging optical system, or the amount of defocus which is calculated first after an autofocus instruction is issued is set as the maximum movable amount.

17. The focus control method according to claim 14, wherein, in the phase difference AF control unit step, the first focus control process and the focus lens movement amount setting process are performed in a burst mode in which the imaging element continuously captures the image of the object a plurality of times and captured image data obtained by each of the plurality of imaging operations is recorded.

18. The focus control method according to claim 14, further comprising:

a contrast AF control step of performing a second focus control process which calculates a focus position based on the captured image signal obtained by the imaging element through the imaging optical system, using a contrast AF system, and moves the focus lens to the calculated focus position, wherein, in a burst mode in which the imaging element continuously captures the image of the object a plurality of times and captured image data obtained by each of the plurality of imaging operations is recorded, the second focus control process in the contrast AF control step is performed for a first imaging operation among the plurality of imaging operations and the first focus control process and the focus lens movement amount setting process are performed for the second and subsequent imaging operations among the plurality of imaging operations.

19. The focus control method according to claim 14, further comprising:

a contrast AF control step of performing a second focus control process which calculates a focus position based on the captured image signal obtained by the imaging element through the imaging optical system, using a contrast AF system, and moves the focus lens to the calculated focus position, wherein, in the state in which the optical filter is present on the optical axis of the imaging optical system, the first focus control process and the focus lens movement amount setting process are performed at all of F-numbers that can be set, in a burst mode in which the imaging element continuously captures the image of the object a plurality of times and captured image data obtained by each of the plurality of imaging operations is recorded, and in a single-shot mode in which the imaging element captures the image of the object one time and captured image data obtained by the one imaging operation is recorded, the second focus control process is performed in a case in which the F-number is less than a threshold value and the first focus control process is performed in a case in which the F-number is equal to or greater than the threshold value.

* * * * *